US006769977B2

(12) United States Patent
Kuck

(10) Patent No.: US 6,769,977 B2
(45) Date of Patent: *Aug. 3, 2004

(54) METHOD FOR PREPARING FOWL MEAT CUT

(76) Inventor: Ted V. Kuck, 12053 State Rte. 29, St. Marys, OH (US) 45885

(*) Notice: Subject to any disclaimer, the term of this patent is extended or adjusted under 35 U.S.C. 154(b) by 332 days.

This patent is subject to a terminal disclaimer.

(21) Appl. No.: 09/908,073

(22) Filed: Jul. 18, 2001

(65) Prior Publication Data

US 2001/0039177 A1 Nov. 8, 2001

Related U.S. Application Data

(63) Continuation of application No. 09/537,881, filed on Mar. 29, 2000, now Pat. No. 6,280,311.
(60) Provisional application No. 60/127,235, filed on Mar. 31, 1999.

(51) Int. Cl.[7] ............................................... A22C 21/00
(52) U.S. Cl. ........................................ 452/135; 452/160
(58) Field of Search ............................. 452/135, 136, 452/148, 160; 426/56, 572

(56) References Cited

U.S. PATENT DOCUMENTS

| 1,433,628 A | | 10/1922 | Knaust ........................ 452/135 |
| 2,571,544 A | | 10/1951 | Cutrera ........................ 452/135 |
| 3,942,222 A | * | 3/1976 | Strandine et al. |
| 4,036,997 A | * | 7/1977 | VerBurg ........................ 426/272 |
| 4,628,569 A | | 12/1986 | Gagliardi, Jr. ................. D1/199 |
| D293,041 S | | 12/1987 | Gagliardi, Jr. ................. D1/199 |
| 4,716,626 A | * | 1/1988 | Chiron et al. ................. 452/136 |
| 4,797,975 A | * | 1/1989 | Soullard et al. ............. 452/135 |
| 5,023,975 A | | 6/1991 | Van Der Hoorn et al. ...... 17/46 |
| 5,088,957 A | | 2/1992 | Gagliardi, Jr. ................. 452/149 |
| 5,195,924 A | | 3/1993 | Gagliardi, Jr. ................. 452/149 |
| 5,250,309 A | | 10/1993 | Gagliardi, Jr. ................. 426/104 |
| 5,266,064 A | | 11/1993 | Gagliardi, Jr. ................. 452/135 |
| 5,286,229 A | | 2/1994 | Gagliardi, Jr. ................. 452/169 |
| 5,368,520 A | * | 11/1994 | Koch et al. |
| 5,372,539 A | | 12/1994 | Kunig et al. ................. 452/135 |
| 5,407,384 A | | 4/1995 | Boody et al. ................. 452/171 |
| 5,464,368 A | | 11/1995 | White et al. ................. 452/135 |

(List continued on next page.)

OTHER PUBLICATIONS

The Making of a Cook Kamman, Madeline; Atheneum. 1971.*
"The Good Housekeeping Illustrated Cookbook", Good Housekeeping. 1989.*
"The Southern Living Cookbook", Payne, Susan Carlisle; Southern Living. 1987.*
"How to carve meat", PageWise. 2001.*
"Broiler Chicken Deboning", Denton, J.H.; Texas Agricultural Experiment Station. Jun. 1988.*

Primary Examiner—Charles T. Jordan
Assistant Examiner—Judith A. Nelson
(74) Attorney, Agent, or Firm—Kinney & Lange, P.A.

(57) ABSTRACT

The present invention is a process or method for cutting and boning a carcass of a fowl to create a meat cut which includes the scapula bone and its associated muscles (meat). The method involves separating the scapula bone and its associated muscles from the carcass of the fowl. The meat cut may be produced with the cutaneous tissues attached to the associated muscles. The resulting meat cut contains a larger percentage of meat and is easier to produce. Alternatively, the cutaneous tissues can be removed from the associated muscles to produce a skinless meat cut. In another alternative embodiment of the present invention, the muscle (meat) associated with the scapula bone can been trimmed to create a meat cut having less meat. In another alternative embodiment of the present invention, multiple meat cuts are placed in a side-by-side orientation and bonded together using a meat bonding agent to create a linked rack of meat cuts or a standing meat roast.

28 Claims, 13 Drawing Sheets

U.S. PATENT DOCUMENTS

| | | | |
|---|---|---|---|
| 5,494,480 A | * | 2/1996 | Passchier .................... 452/135 |
| 5,525,103 A | * | 6/1996 | White et al. ................ 452/135 |
| 5,660,583 A | * | 8/1997 | Roberts |
| 5,779,532 A | * | 7/1998 | Gagliardi, Jr. .............. 452/135 |
| 5,902,177 A | | 5/1999 | Tessier et al. ............... 452/156 |
| 5,932,278 A | | 8/1999 | Gagliardi, Jr. .............. 452/135 |
| 6,221,405 B1 | * | 4/2001 | Sheehy et al. ................ 426/56 |
| 6,280,311 B1 | * | 8/2001 | Kuck |

\* cited by examiner

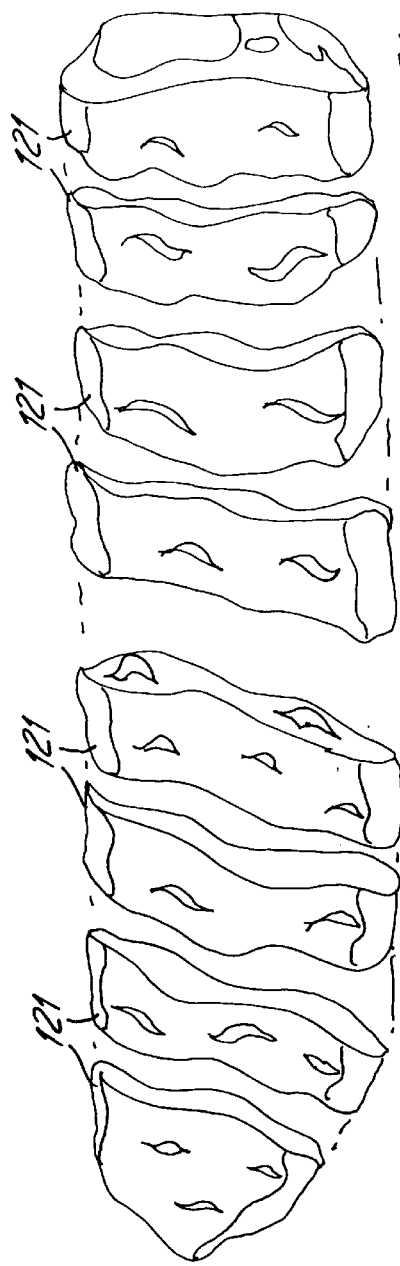
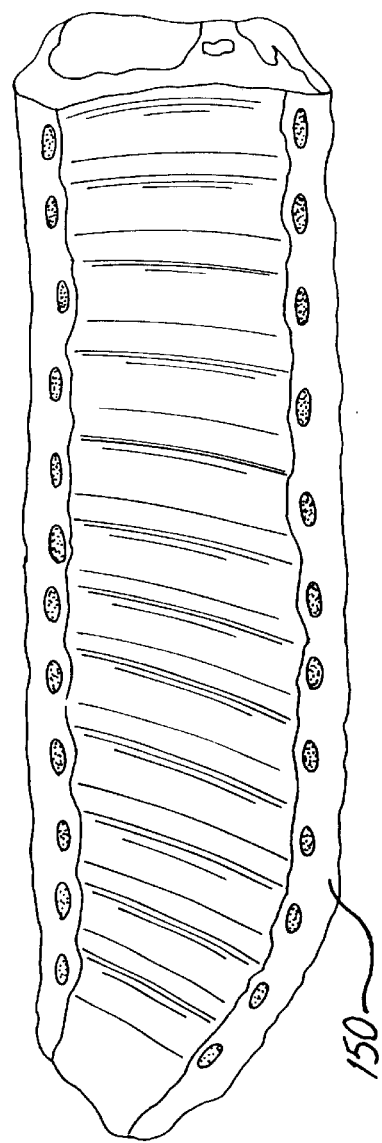
FIG. 17A
FIG. 17B

METHOD FOR PREPARING FOWL MEAT CUT

CROSS-REFERENCE TO RELATED APPLICATION(S)

This application is a continuation of application Ser. No. 09/537,881 filed on Mar. 29, 2000, for "Process For Preparing Turkey Rib Cuts" by Ted V. Kuck now U.S. Pat. No. 6,280,311 which claims priority from U.S. Provisional Patent Application Ser. No. 60/127,235 filed on Mar. 31, 1999, for "Process For Preparing Turkey Rib Cuts" by Ted V. Kuck.

BACKGROUND OF THE INVENTION

The present invention relates to a process for preparing a meat product from an animal carcass. In particular, the present invention relates to a method for cutting and boning a turkey to produce turkey rib cuts.

In recent years, individuals have become increasingly health conscious. As links between eating red meat and various diseases (including heart disease and cancer) have been uncovered, turkey meat has gained popularity as a red meat substitute. Today, turkey burgers and a large selection turkey-based cold cuts are commercially available. As individuals become more health conscious, the demand for other turkey meat products will certainly increase.

Turkey carcasses are typically butchered into several main cuts or sections including breast, wing, thigh, leg and scapula meat sections. The scapula bone refers to either of a pair bones lying one in each dorsal lateral part of the thorax, being the principal bone of the corresponding half of the shoulder girdle, and articulating with the corresponding clavicle or coracoid. Typically, the turkey scapula bone and its associated muscles (meat) are not sold as a separate cut of turkey meat, but are sold as scrap meat with the remaining turkey carcass after the main cuts are removed. The remaining meat that adheres to the scapula bone is usually ground and extruded to be sold for non-human consumption as mechanically deboned meat (at a price considerably less than the main cuts).

Conventional scapula meat salvage techniques are inefficient (producing minimal yields of meat), difficult to implement, and time and labor intensive. The scapula meat is difficult to remove from the turkey carcass with automated equipment. A current method of salvaging some meat attached to the scapula bone produces minimal yields and involves extensive time and labor by the butcher. The butcher must remove the scapula bone from the turkey carcass and manually trim the meat that adheres to the scapula bone. This technique requires extensive trimwork to yield an amount of meat that pales in comparison to the main cuts. Due to the difficulty of the trimwork, current trimming techniques yield only approximately 50% of the meat attached to the scapula bone. Many turkey butchers do not even attempt to salvage the meat attached to the scapula bone due to the large investment of time and labor required to salvage the meat attached to the scapula bone. Instead, the scapula bone and its attached meat remain with the turkey carcass after the main cuts have been removed, and are treated as scrap meat that will be ground and extruded to be sold as mechanically deboned meat. Consequently, conventional scapula meat salvage techniques do not provide a substantial amount of meat and are difficult to implement.

Accordingly, there is a need for a method of using the scapula meat to increase the potential "per pound" profit of a whole turkey carcass, while also developing new types of turkey products to attract additional consumers. The present invention fulfills such needs by providing a method for cutting and boning a whole turkey carcass to create a turkey rib cut which includes the scapula bone and its associated muscles (meat). The turkey rib cut has sufficient perceived value to be marketed as a separate turkey product.

BRIEF SUMMARY OF THE INVENTION

The present invention is a process or method for cutting and boning a fowl to create a meat cut which includes the scapula bone and its associated muscles (meat). The method involves separating the scapula bone and its associated muscles from the carcass of the fowl. The meat cut may be produced with the cutaneous tissues attached to the associated muscles. The resulting meat cut contains a larger percentage of meat and is easier to produce. Alternatively, the cutaneous tissues can be removed from the associated muscles to produce a skinless meat cut. In another alternative embodiment of the present invention, the muscle (meat) associated with the scapula bone can been trimmed to create a meat cut having less meat. In another alternative embodiment of the present invention, multiple meat cuts are placed in a side-by-side orientation and bonded together using a meat bonding agent to create a linked rack of meat cuts or a standing meat roast.

The inventive fowl meat cut is a new food product. The meat attached to the scapula bone, which is normally sold as mechanically deboned meat, will now be a separate meat cut. The entire scapula bone and its adhering meat is sold as an individual meat cut that can be marketed as a rib, which will increase the carcass value when sold. The relationship of using a scapula bone to a rib from a pork cut or cattle cut opens the door for a new meat product and meat cut.

BRIEF DESCRIPTION OF THE DRAWINGS

FIG. 17A is a perspective view of another alternative embodiment of the present invention in which individual turkey rib cuts are aligned to be bonded together to form a "rack" of turkey ribs.

FIG. 17B is a perspective view of another alternative embodiment of the present invention in which individual turkey rib cuts are bonded together to form a "rack" of turkey ribs.

While the above-identified drawings set forth preferred embodiments of the present invention, other embodiments of the present invention are also contemplated, as noted in the discussion. This disclosure presents illustrative embodiments of the present invention by the way of representation and not limitation. Numerous other modifications and embodiments can be devised by those skilled in the art which fall within the scope and spirit of the principles of this invention.

DETAILED DESCRIPTION

The present invention is a process or method for cutting and boning a turkey to create a turkey rib cut which includes the scapula bone and its associated muscles (meat). In butchered meats (i.e., cattle, pork, etc.), the rib cut generally consists of rib bones and related intercostal meat. As conventionally known, the turkey rib cut is not butchered because there is not enough intercostal meat situated or extending between the rib bones to make the cut commercially viable. However, the present invention discloses a process or method for cutting and boning a turkey's scapula bone and its associated muscles (meat) to create a turkey "rib" cut.

The turkey rib cut of the present invention is a new turkey food product. The entire scapula bone and its adhering meat is sold as an individual cut to be marketed as a "turkey ribs". The turkey rib cut of the present invention produces ribs that are similar in appearance and consistency to pork or cattle ribs. Thus, the turkey rib cut of the present invention may be used as a substitute for a pork rib cut or cattle rib cut.

Figure 1:
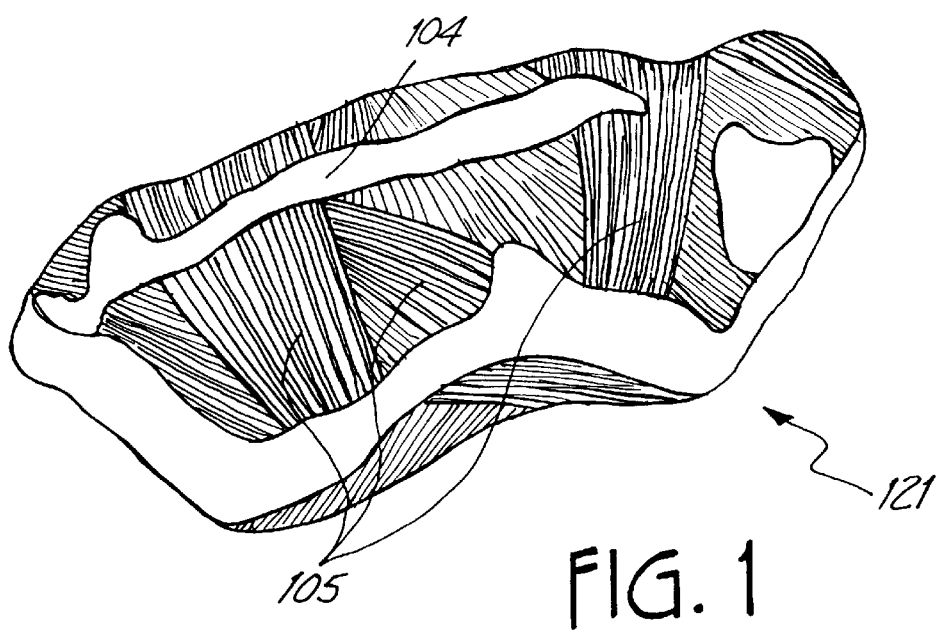
FIG. 1 is a perspective view of a skinless turkey rib cut of the present invention.
Figure 16:
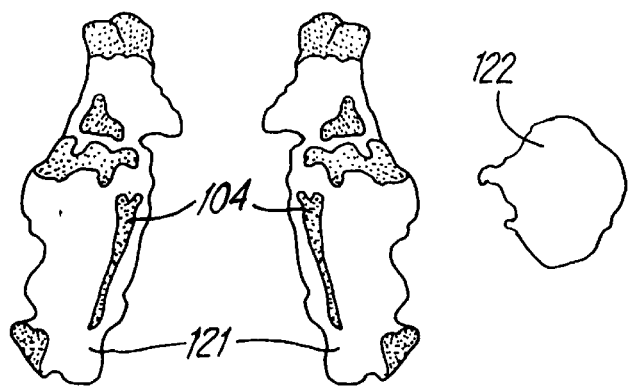
FIG. 16 is a perspective view of the completed left and right turkey rib cuts showing another alternative embodiment of the present invention where the muscle (meat) associated with the scapula bones has been trimmed to create a turkey rib cut having less meat.

As shown in FIG. 1, the method of the present invention involves separating a scapula bone 104 and its associated muscles 105 from a turkey carcass to yield a turkey rib cut 121. The turkey rib cut 121 may be produced with a cutaneous tissues (turkey skin) 106 attached to the associated muscles 105. The resulting turkey rib cut 121 contains a larger percentage of meat and is easier to produce. Alternatively, the cutaneous tissues (turkey skin) 106 can be removed from the associated muscles 105 to produce a skinless turkey rib cut 121 as shown in FIG. 1. In another alternative embodiment of the present invention, the muscle (meat) 105 associated with the scapula bone 104 can been trimmed to create a turkey rib cut 121 having less meat as shown in FIG. 16.

The associated muscles 105 attached to the scapula bone 104 that are the meat of the turkey rib cut 121 include: the spinatus; the trapezius; the rhomboideus; the teres major; the serratus ventralis; the serratus dorsalis; the subscapularis; and the teres minor (muscle terminology used in F. N. Chamberlain, D. V. M., *Atlas of Avian Anatomy* (Hallenbeck Printing Company, Lansing, Mich. 1943)). The associated muscles 105 adhering to the scapula bone 104 further comprise muscles of a lateral surface of a thorax from a vertical line through a thirteenth cervical vertebra to a vertical line posterior to a third thiouracil vertebra.

The spinatus' origin (the more fixed, central or larger attachment of the muscle) is the dorsal surface of the distal extremity of the scapula. The spinatus' insertion (attachment to the part to be moved) is the dorsal surface of the proximal extremity of the humerus. The trapezius' origin is the supira spinous ligament of the thoracic spines of thoracil vertebrae I to VI. The trapezius' insertion is the vertebral surface of the scapula. The rhomboideus' origin is the supra spinous ligament spines of the thoracil vertebrae I to V. The rhomboideus' insertion is the vertebral surface of the scapula. The teres major's origin is the caudal surface of the lateral surface of the scapula. The teres major's insertion is the medio ventral fossa of the proximal extremity of the humerus. The serratus ventralis' origin is the distal lateral surface of the II, V, and VII vertebrae. The serratus ventralis' insertion is the ventral costal border of the scapula. The serratus dorsalis' origin is the lateral surface of the distal extremities of the vertebral ribs. The serratus dorsalis' insertion is the ventral surface of the scapula. The subscapularis' origin is the distal third of the costal surface of the scapula. The subscapularis' insertion is in common with the coracoid muscles of the proximal tuberosity of the humerus. The teres minor is a very small cylindrical muscle whose origin is the latero distal part of the ventral border of the scapula. The teres minor's insertion is on the humerus in an elevation lateral to the head.

Figure 2:
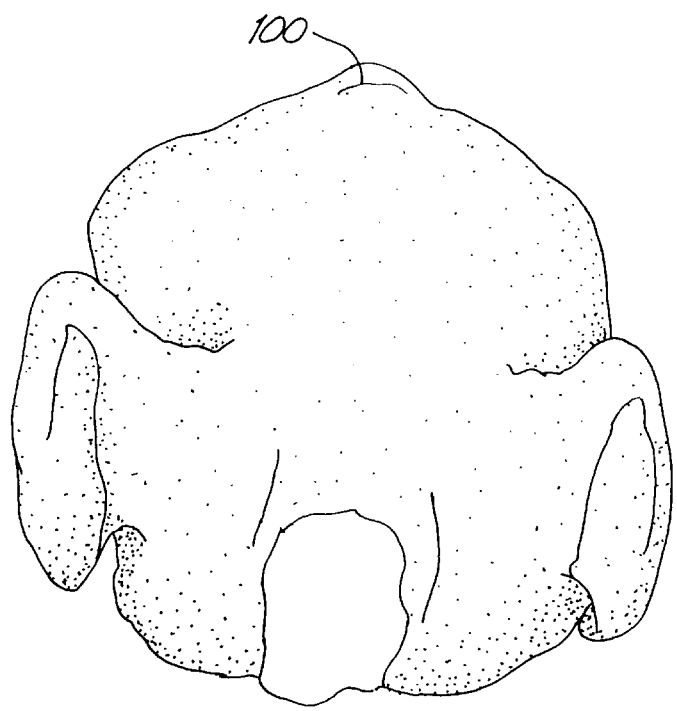
FIG. 2 is a perspective view of a turkey carcass that has been decapitated and de-feathered in preparation for being butchered.
Figure 3:
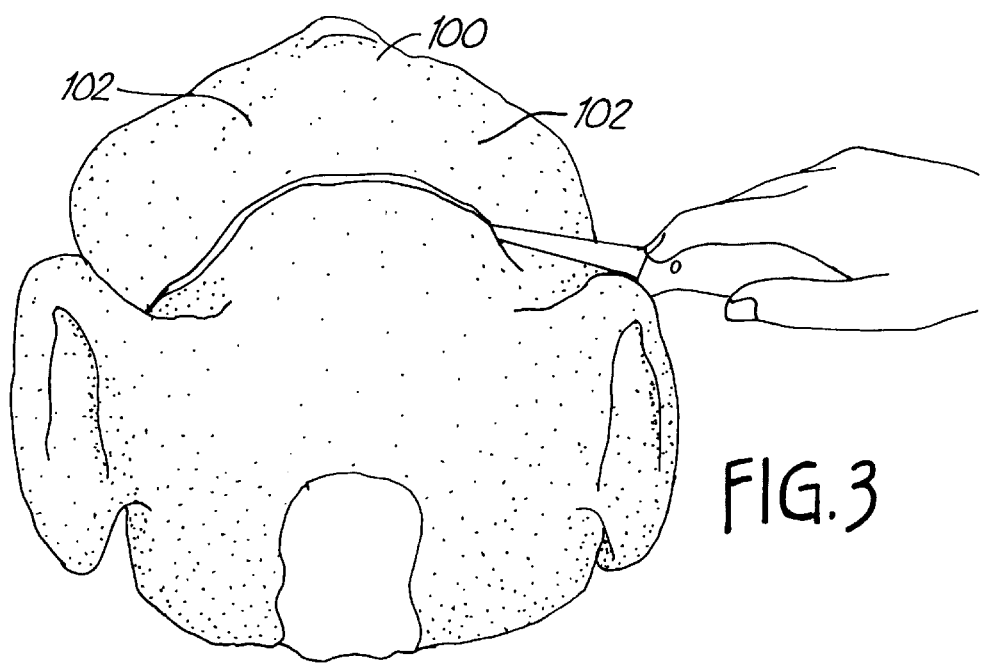
FIG. 3 is a perspective view of a turkey carcass being butchered showing a cross cut between the thighs and the scapula bone.

The method of the present invention to create the turkey rib cut 121 can be seen in FIGS. 2–16. FIG. 2 shows a turkey carcass 100 that has been decapitated and de-feathered in preparation for being butchered. FIG. 3 shows the first butchering cut or incision made in the turkey carcass 100. The first butchering cut is a cross cut on the midsection of the turkey carcass 100 between its thighs 102 and its two scapula bones 104. The left and right scapula bones 104 are not visible as they are internal to the turkey carcass 100 under the cutaneous tissues (turkey skin) 106 and the associated muscles 105.

Figure 4:
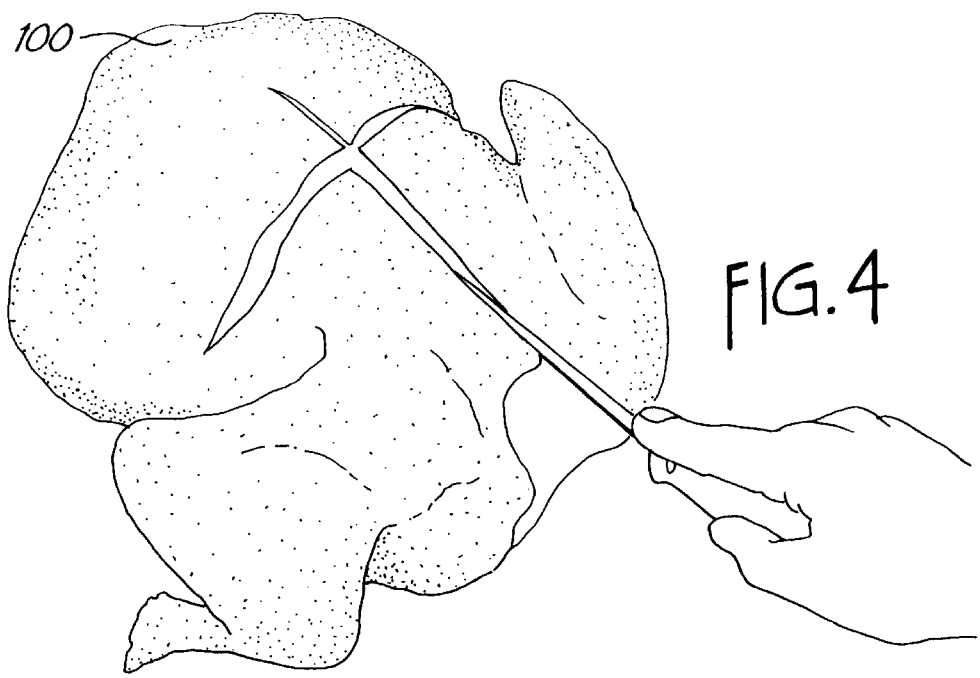
FIG. 4 is a perspective view of a turkey carcass being butchered showing a cut between the left and the right scapula bones.

FIG. 4 shows the second butchering cut or incision made in the turkey carcass 100. The second butchering cut is roughly perpendicular to the first butchering cut and runs between the left and right scapula bones 104 of the turkey carcass 100. The order of the first and second butchering cuts may be reversed as long as the two cuts are roughly perpendicular.

Figure 5:
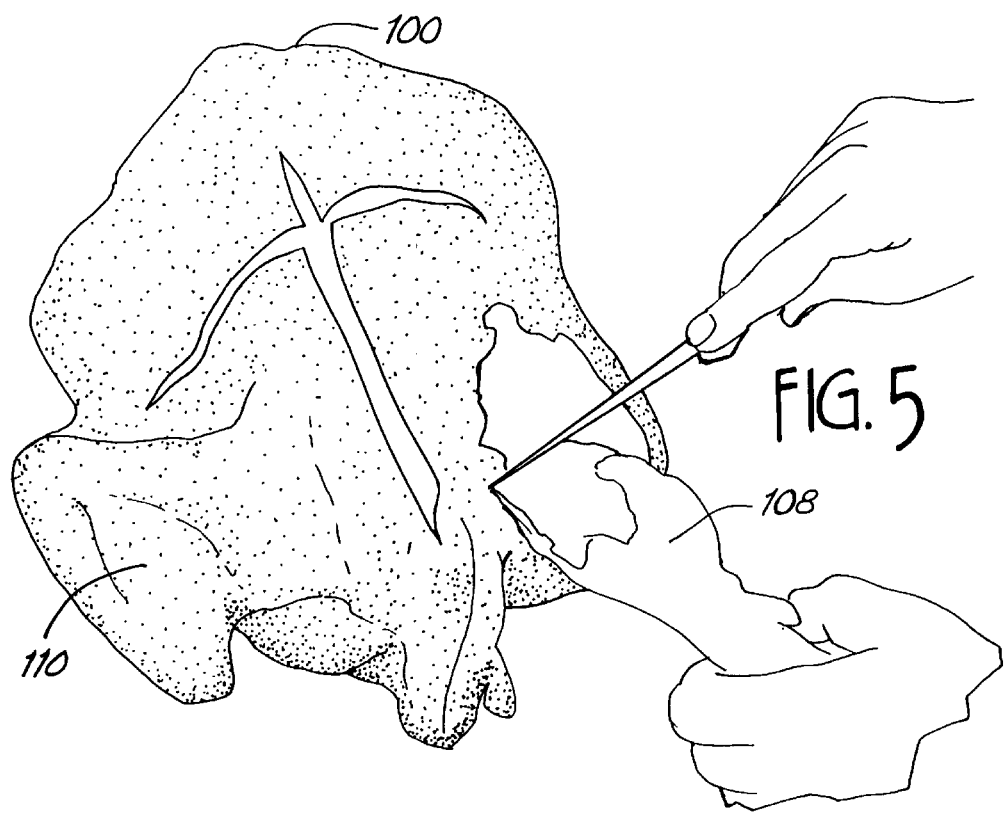
FIG. 5 is a perspective view of a turkey carcass being butchered showing the removal of the right wing from the turkey carcass.
Figure 6:
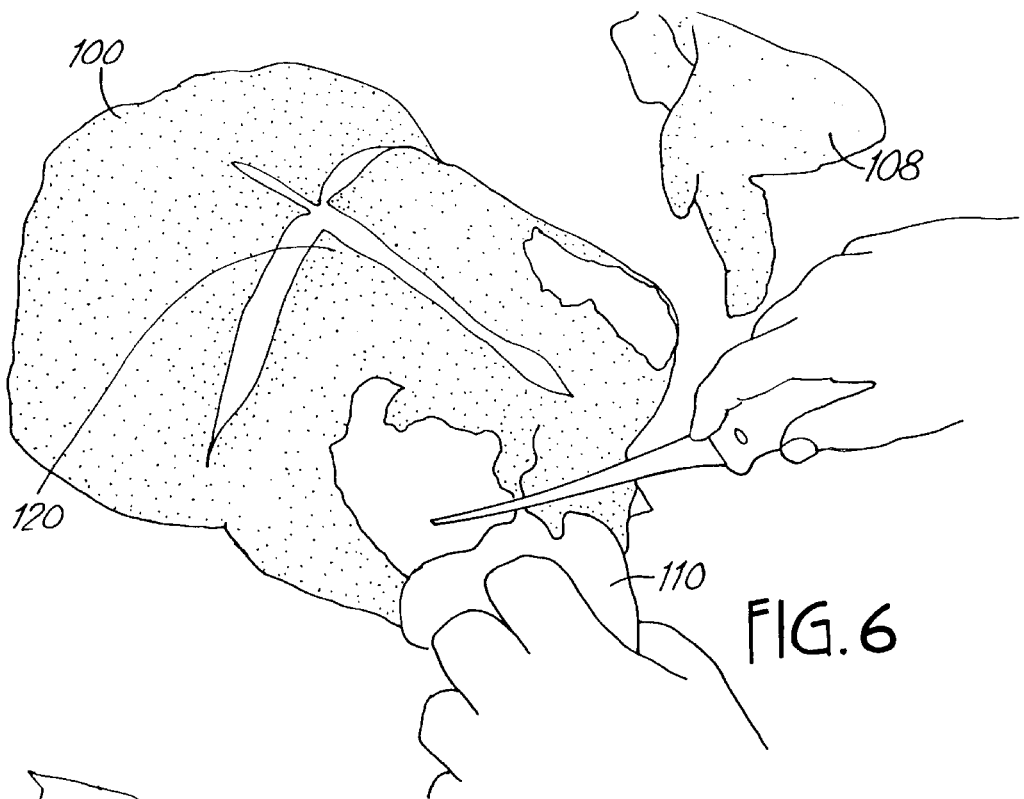
FIG. 6 is a perspective view of a turkey carcass being butchered showing the removal of the left wing from the turkey carcass.
Figure 7:
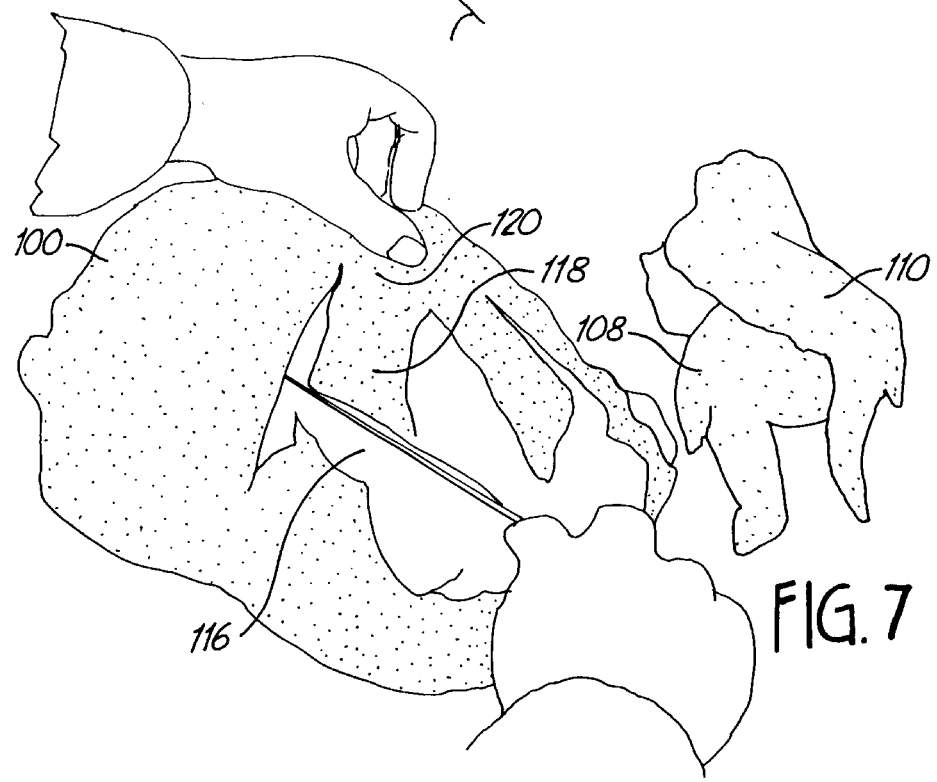
FIG. 7 is a perspective view of a turkey carcass being butchered showing a cut according to the present invention between the breast meat and the scapula meat on the left side of the turkey carcass.
Figure 8:
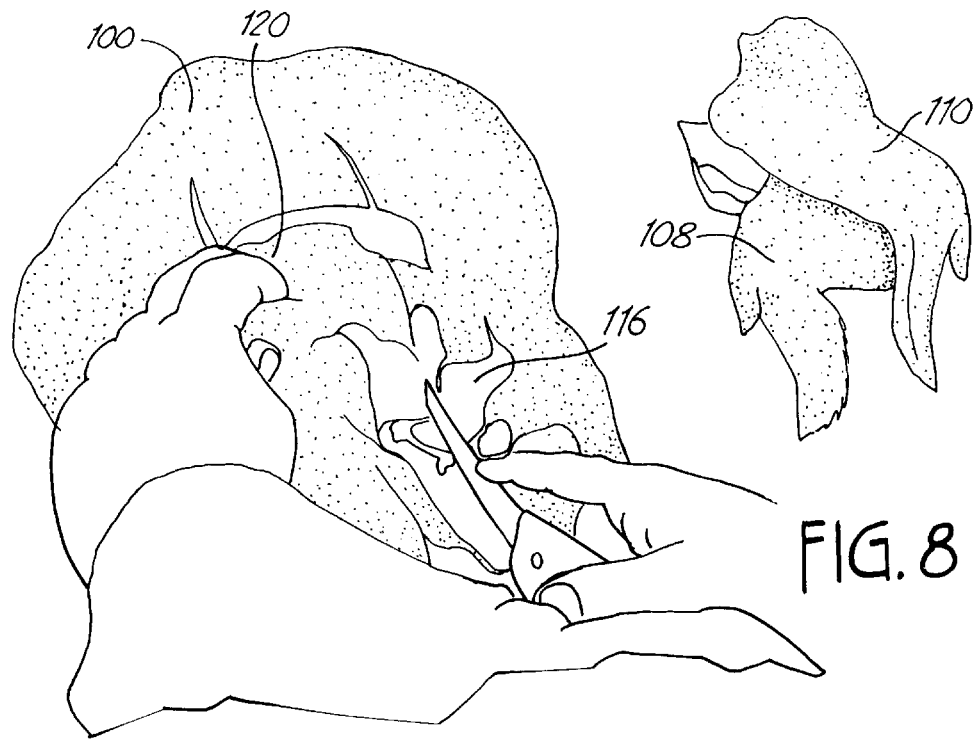
FIG. 8 is a perspective view of a turkey carcass being butchered showing a cut according to the present invention between the breast meat and the scapula meat on the right side of the turkey carcass.
Figure 18:
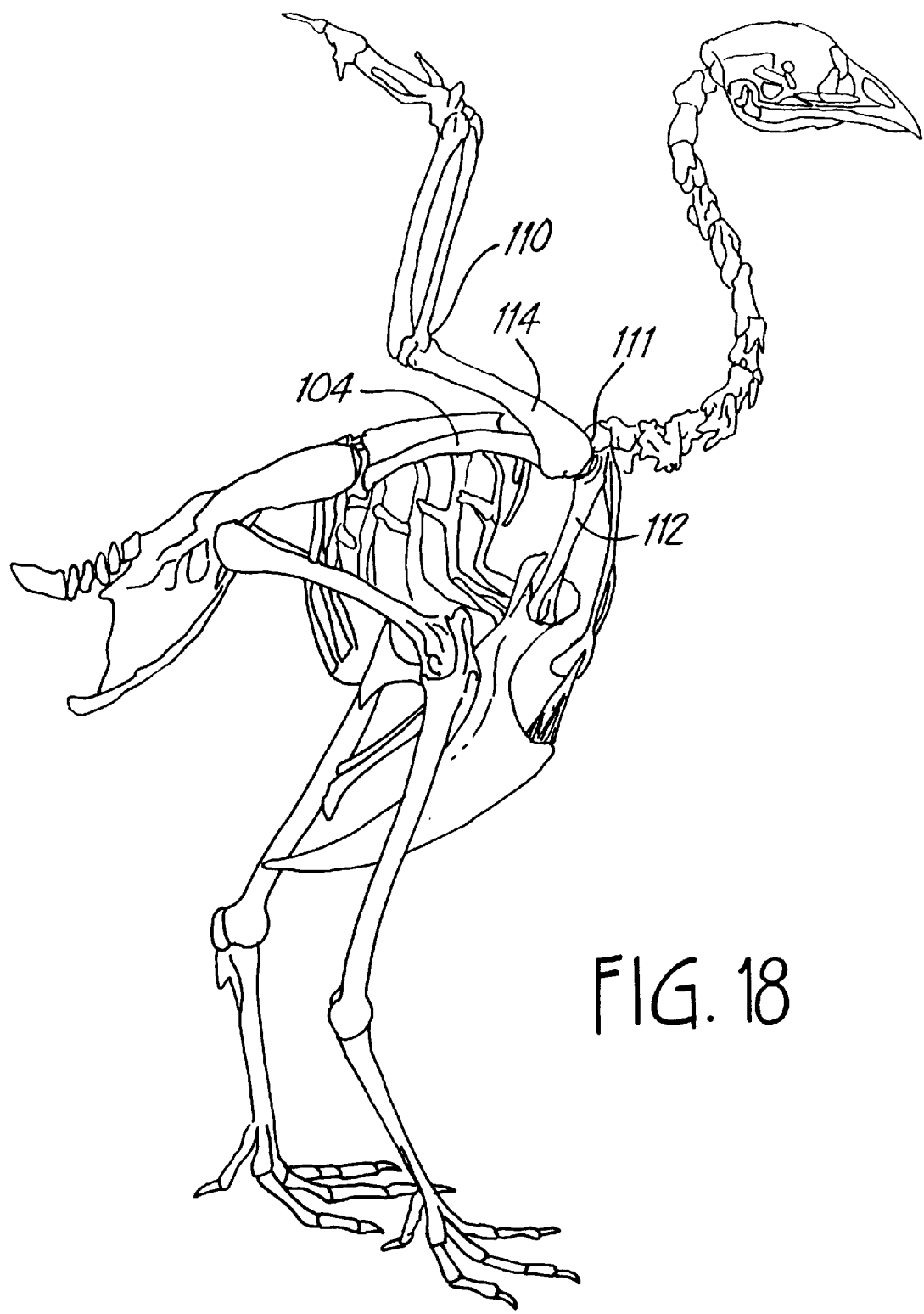
FIG. 18 is a schematic illustration of the osteology (skeletal system) of a turkey showing the scapula bone.
Figure 21:
FIG. 21 is an enlarged schematic view of the pectoral limb (wing) of a turkey.

FIGS. 5 and 6 illustrate the removal of the right wing 108 and left wing 110 and hindquarters from the turkey carcass 100. As shown in FIG. 18, the butchering cut or incision to remove the turkey wings 108, 110 runs through a joint 111 that connects the scapula 104, a coracoid 112 and a humerus 114. This butchering cut through the joint 111 separates the turkey wing 108, 110 (including the humerus 114) from the turkey carcass 100, while the scapula 104 (and its adhering meat including muscles attached to a proximal end of the humerus 114) and the coracoid 112 remain attached to the turkey carcass 100. FIG. 21 is an exploded view of a turkey wing showing the humerus 114 separated from the scapula 104 and the coracoid 112 (which are not shown).

The next butchering cut or incision runs between the breast meat 116 and the scapula meat 118 on the left side (FIG. 7) and the right side (FIG. 8) of the turkey carcass 100. This butchering cut enters the turkey above the breast meat 116, ensuring that the breast meat 116 (a main cut of the turkey) remains undisturbed. Pulling upward on a rear corner flap 120 of the turkey rib at the intersection of the first and second butchering cuts permits easier cutting as the knife cuts above the breast meat 116.

Figure 9:
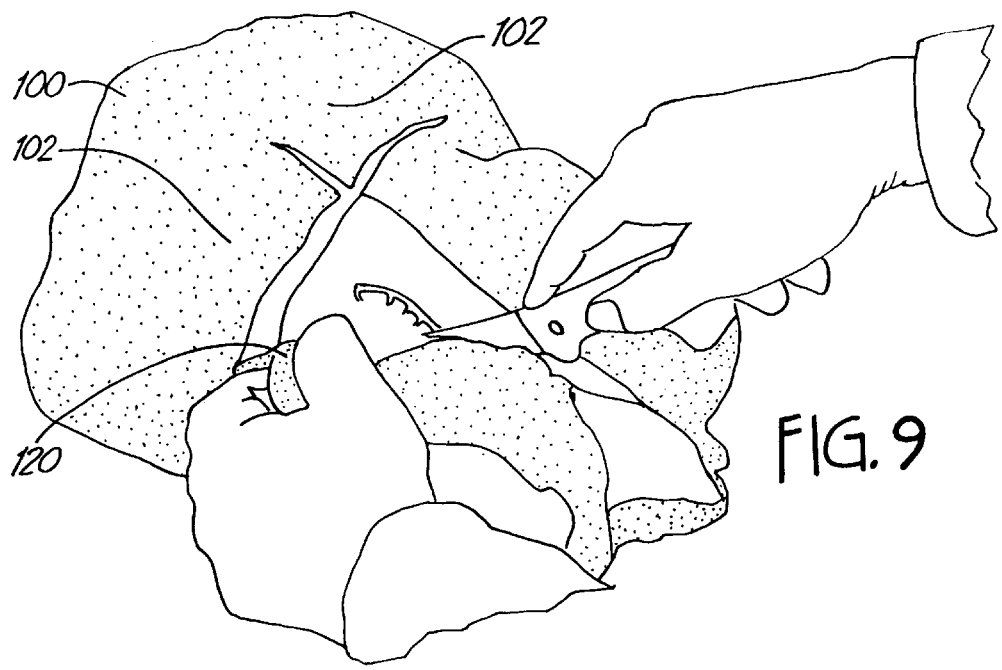
FIG. 9 is a perspective view of a turkey carcass being butchered showing a cut on the left side of the turkey carcass according to the present invention to create a turkey rib cut.
Figure 19:
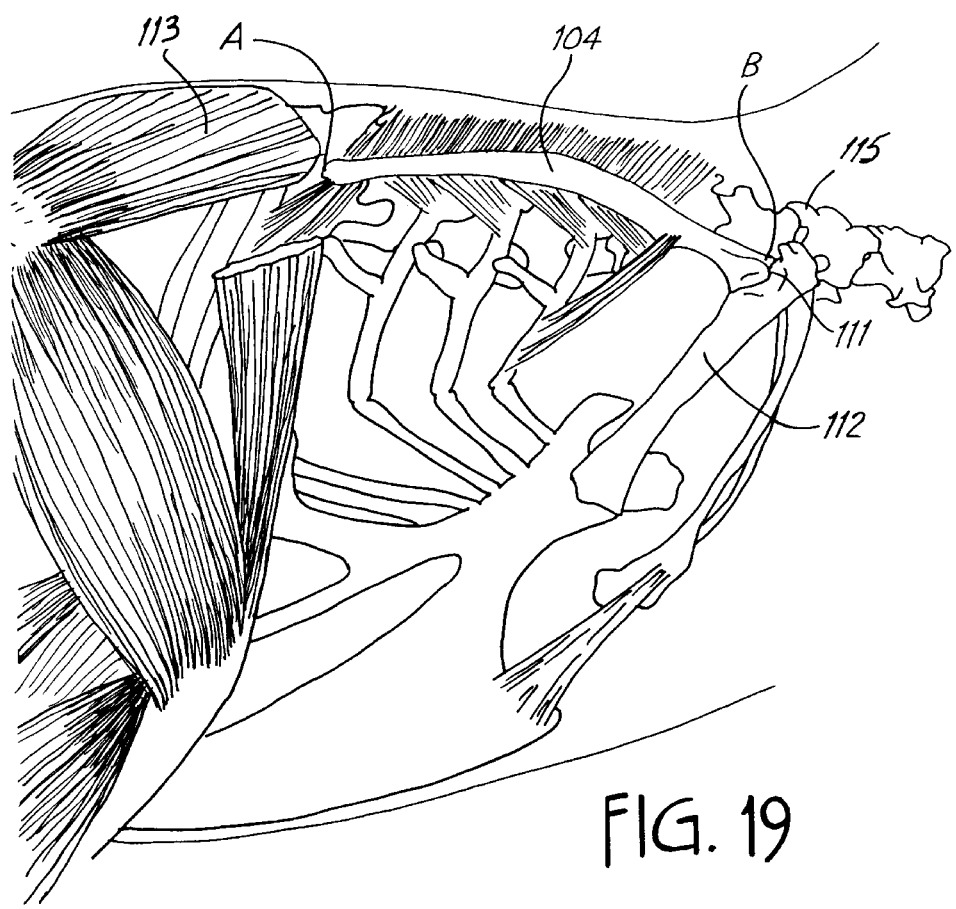
FIG. 19 is an enlarged schematic side view of the pelvic muscles and bones of a turkey showing the scapula bone.
Figure 20:
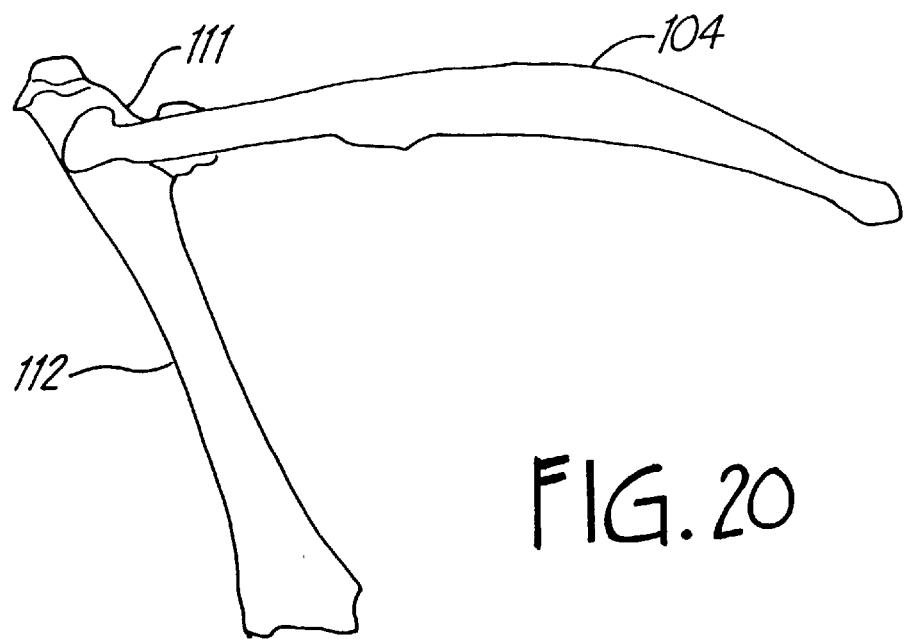
FIG. 20 is an enlarged schematic side view of the scapula and coracoid bones of a turkey.

FIG. 9 shows the next butchering cut or incision of the present invention to create a turkey rib cut on the left side of the turkey carcass 100. This butchering cut runs across the turkey's back beginning at the thighs 102 toward where the head would be connected to the turkey carcass 100. As shown in FIG. 19, the knife enters the turkey at reference point A between the ball end of the scapula bone 104 and a gluteus medius muscle sheath 113. The butcher pulls the knife along a backbone 115 toward where the head would be connected to the turkey carcass 100 until reaching reference point B, which is a socket connection between the scapula 104 and the coracoid 112. To facilitate a smoother cut, the butcher may grab onto the rear corner flap 120 (FIG. 9) with his/her fingers and pull up and out (away from the turkey carcass 100). Pulling up and out on the rear corner flap 120 places the muscles in tension. This allows easier and smoother cutting while the knife is held tight along the backbone 115.

Figure 10:
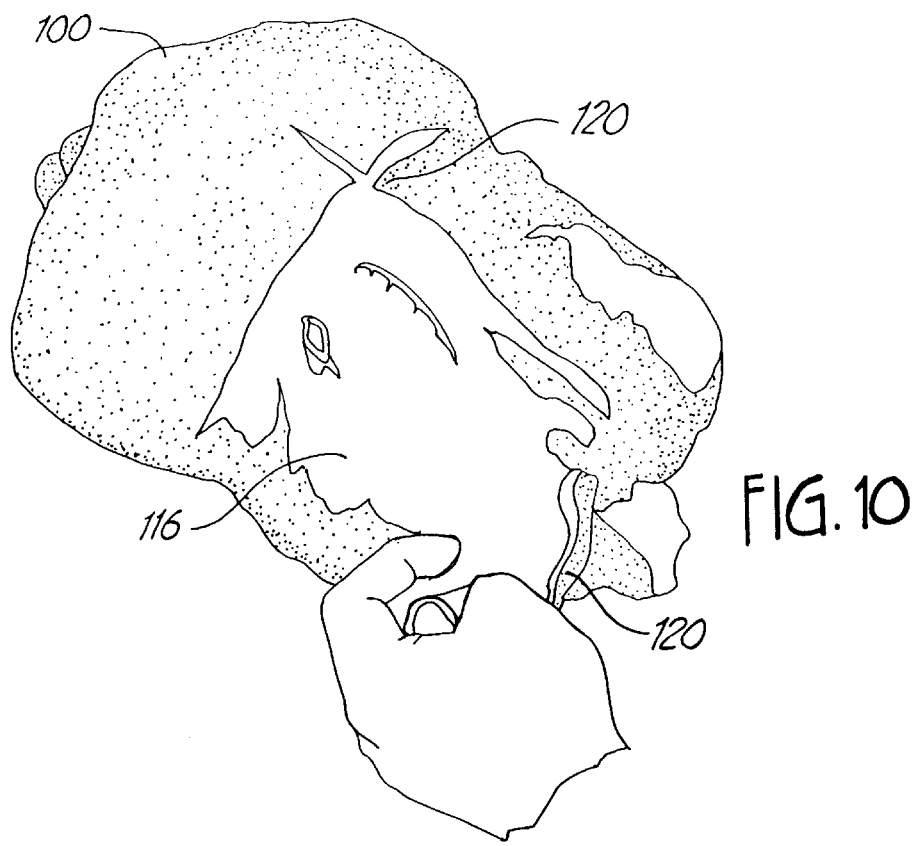
FIG. 10 is a perspective view of a turkey carcass being butchered showing the removal of entire scapula bone and attached muscle (meat) on the left side of the turkey carcass according to the present invention to create a turkey rib cut.
Figure 11:
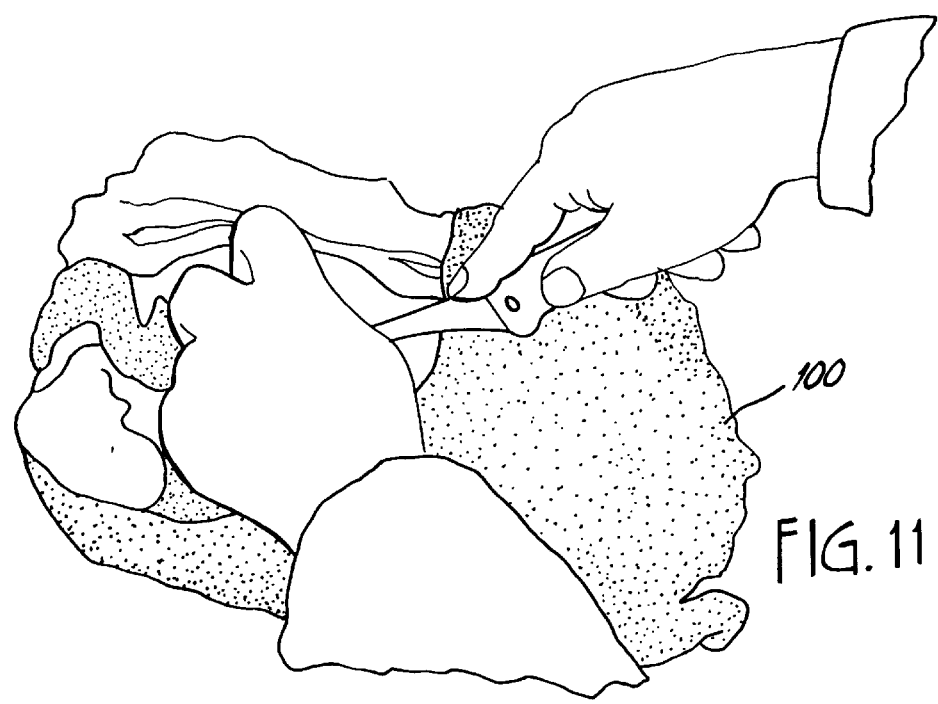
FIG. 11 is a perspective view of a turkey carcass being butchered showing a cut on the right side of the turkey carcass according to the present invention to create a turkey rib cut.
Figure 12:
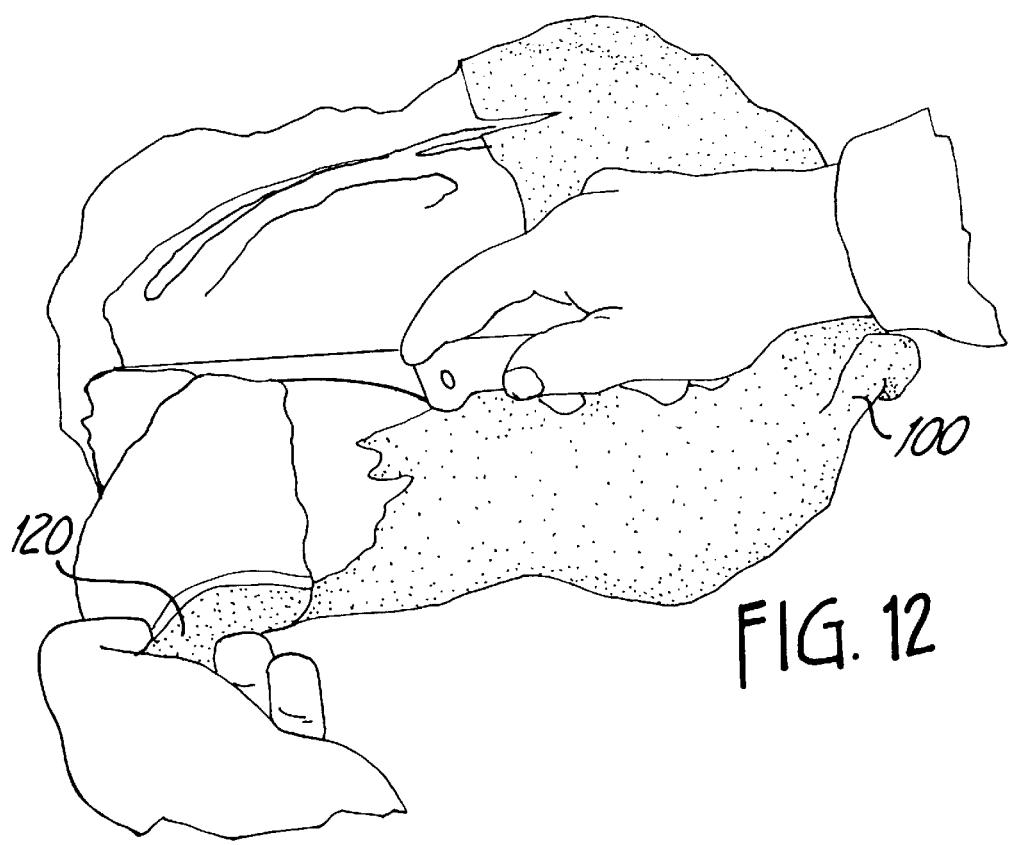
FIG. 12 is a perspective view of a turkey carcass being butchered showing the removal of entire scapula bone and attached muscle (meat) on the right side of the turkey carcass according to the present invention to create a turkey rib cut.

After the cut has reached from reference point A to reference point B, the butcher lifts the scapula bone 104 and cracks the scapula bone 104 out of the joint 111 connecting it to the coracoid 112 as shown in FIG. 10. After the scapula bone 104 is dislodged from the joint 111, the scapula bone 104 and its adhering meat can be removed from the turkey carcass 100. When the scapula bone 104 is separated from the turkey carcass 100 the adhering meat remains attached to the scapula bone 104. The separated scapula bone 104 and its adhering meat are now a "turkey rib" cut 121. The same butchering cut and scapula removal process is then performed on the right side of the turkey carcass 100 as shown in FIGS. 11 and 12 to produce another turkey rib cut 121.

Figure 13:
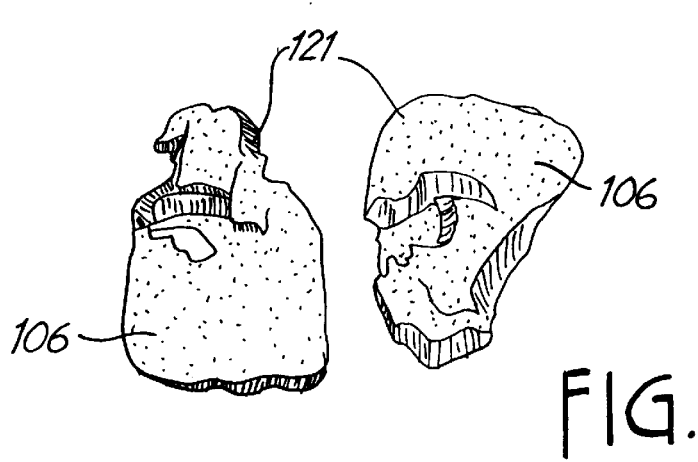
FIG. 13 is a perspective view of the completed left and right side turkey rib cuts of the present invention showing the entire scapula bones, muscles (meat) and cutaneous tissues (turkey skin).

Each turkey carcass 100 will produce two turkey rib cuts 121 of the present invention—one from the left side and one from the right side. The completed left and right side turkey rib cuts 121 of the present invention showing the entire scapula bones 104, muscles (meat) and cutaneous tissues (turkey skin) 106 are shown in FIG. 13. In a preferred embodiment of the present invention, the turkey rib cuts 121 include the cutaneous tissues (turkey skin) 106. This produces a very meaty rib.

Figure 14:
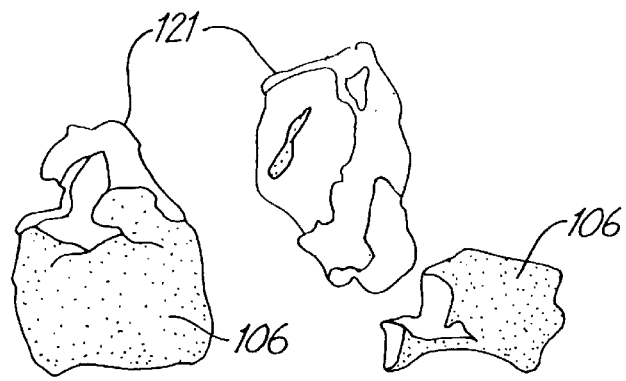
FIG. 14 is a perspective view of the completed left and right turkey rib cuts of FIG. 13 showing an alternative embodiment of the present invention where the cutaneous tissues (turkey skin) has been removed from the right turkey rib cut.
Figure 15:
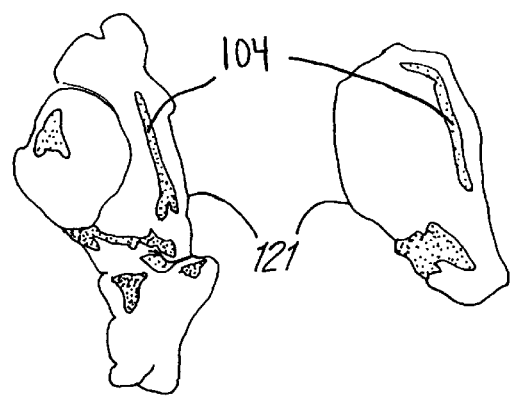
FIG. 15 is a perspective view of the completed left and right turkey rib cuts of FIG. 14 showing an alternative embodiment of the present invention where the cutaneous tissues (turkey skin) has been removed from the left and right turkey rib cuts, creating skinless turkey rib cuts.

In an alternative embodiment of the present invention, the cutaneous tissues (turkey skin) 106 can be removed, creating skinless turkey rib cuts. The skinless rib cut allows individuals concerned with the caloric intake and fat content of the turkey skin to enjoy the turkey rib without consuming the turkey skin. FIG. 14 shows a comparison between the preferred embodiment (skin-on ribs—left side of FIG. 14) and the alternative embodiment (skinless ribs—right side of FIG. 14). FIG. 15 shows both turkey rib cuts 121 as skinless.

In another alternative embodiment of the present invention, the muscle (meat) associated with the scapula bones 104 can be trimmed to create a less meaty turkey rib cut 121 as shown in FIG. 16. In this embodiment, one-half to two-thirds of the scapula meat is trimmed from the scapula bone 104 and sold as a standard scapula cut 122. Even if all the scapula meat is removed, enough meat remains attached to the scapula bone 104 to sell as a turkey rib cut. Traditionally, the meat that remains attached to the scapula bone 104 would remain with the turkey carcass 100 and be processed to become mechanically deboned meat (which is sold at a lower price than the turkey rib cut). Under the present invention, the meat attached to the scapula bone, which is normally sold as mechanically deboned meat, will now be a separate turkey rib cut. Thus, the turkey rib cut increases the salvage value of the turkey carcass 100 by creating a new, valuable cut of meat from what otherwise would be less valuable mechanically deboned meat.

In another alternative embodiment of the present invention, several turkey rib cuts may be bonded together to create a "rack" of ribs. As shown in FIG. 17A, individual turkey rib cuts 121 are placed side-by-side in preparation for being bonded together using meat binders (i.e., Fibrinigen and Activa are examples of cold meat binders) to create a "rack" of ribs. FIG. 17B shows the assembled "rack" of ribs 150. Any number of turkey rib cuts 121 can be bonded together to make the assembled "rack" of ribs 150 as large as necessary. The turkey rib cuts 121 that are bonded together to form the assembled "rack" of ribs 150 may be as lean as desired, creating the assembled "rack" of ribs 150 with a higher or lower percentage of meat to bone. The turkey rib cuts 121 may be cold-bonded together to create an uncooked, linked rack of ribs 150 that could be sold as a raw product and cooked by the consumer. In a further embodiment, pre-cooked turkey rib cuts 121 may be linked together using other meat binders or standard bonding agents (salts or natural proteins) to create a pre-cooked "rack" of ribs 150.

A static marinade (no agitation) or a tumble/massage marinade (agitation) may be used to bond individual turkey rib cuts 121 together to create the "rack" of ribs 150. The static marinade or the tumble/massage marinade may include any or all of the following ingredients: salts, phosphates, proteins (soy, milk, or meat proteins—hydrolyzed or non-hydrolyzed), gums, spice extractives, flavor extractives or any other suitable ingredient or flavor profile including any generally regarded as safe (GRAS) food ingredients. A soy protein may be used to hold moisture in the meat to maintain juicy, tender turkey rib cuts 121.

In another alternative embodiment of the present invention, several turkey rib cuts 121 may be bonded together to create a standing turkey rib roast.

The standing rib roast is created using the same concept that is used to create the "rack" of ribs 150 described above. In addition, the scapula bone of the turkey rib cut is bonded to additional turkey breast meat to create the standing turkey rib roast.

The disclosed description and figures refer specifically to a method for preparing rib cuts from the scapula bone and adhering meat of a turkey. The inventive method for preparing rib cuts can be applied to any fowl of any species including, but not limited to, turkeys, chickens, geese, pheasants, ducks, ostriches, or any other animal.

Although the present invention has been described with reference to preferred embodiments, workers skilled in the art will recognize that changes may be made in form and detail without departing from the spirit and scope of the invention.

What is claimed is:

1. A method for forming a meat cut from a carcass of a fowl, the method comprising:
   separating a scapula bone and muscles adhering to the scapula bone from a breast of the fowl; and
   removing the scapula bone and muscles adhering to the scapula bone from the carcass of the fowl.

2. The method of claim 1 wherein the muscles adhering to the scapula bone include muscles from the group consisting of a spinatus.

3. The method of claim 2 wherein the muscles adhering to the scapula bone further include muscles from the groups consisting of a trapezius, a rhomboideus, a teres major, a serratus ventralis, a serratus dorsalis, a subscapularis, and a teres minor.

4. The method of claim 3 wherein the muscles adhering to the scapula bone further include muscles from the group consisting of muscles of a lateral surface of a thorax from a vertical line through a thirteenth cervical vertebra to a vertical line posterior to a third thiouracil vertebra.

5. The method of claim 1 wherein the muscles adhering to the scapula bone are trimmed to leave a less substantial portion of the muscles adhering to the scapula bone.

6. The method of claim 1 wherein the muscles adhering to the scapula bone are trimmed to create a meat cut with a lower ratio of meat to bone.

7. The method of claim 1 wherein a cutaneous tissue covering the muscles adhering to the scapula bone is removed, creating a skinless meat cut.

8. The method of claim 1 further comprising:
   placing multiple meat cuts having the scapula bone and muscles adhering to the scapula bone in a side-by-side orientation; and
   bonding the side-by-side meat cuts together using a meat bonding agent to create a linked rack of meat cuts having the scapula bone and the muscles adhering to the scapula bone.

9. A meat product formed in accordance with the method of claim 1.

10. A method of cutting a whole carcass of a fowl to create a meat cut from a scapula bone and meat attached to the scapula bone, the method comprising the steps of:
    cutting the whole carcass of the fowl below a pair of wings between a location of a dorsal ball end of the scapula bones and a pair of thighs;
    cutting longitudinally between a left scapula bone and a right scapula bone, substantially perpendicular to the previous incision;
    removing the wings and hindquarters from the whole carcass of the fowl, thereby forming a wingless carcass of the fowl;
    cutting on either a left side or a right side of the whole carcass of the fowl between a breast section and a section including meat attached to the scapula bone;
    cutting on either a left side or a right side of the whole carcass of the fowl along a backbone from the dorsal ball end of the scapula bone toward where a head was formerly connected to the whole carcass of the fowl until reaching a joint connecting the scapula bone to a coracoid bone; and
    separating the scapula bone from either the left side or the right side of the whole carcass of the fowl, thereby creating two scapula bone products, one from the left side and one from the right side of the whole carcass of the fowl, each product having the scapula bone and attached meat thereon.

11. The method of claim 10 wherein the meat attached to the scapula bone includes muscles from the groups consisting of a spinatus, a trapezius, a rhomboideus, a teres major, a serratus ventralis, a serratus dorsalis, a subscapularis, and a teres minor.

12. The method of claim 11 wherein the meat attached to the scapula bone further includes muscles from the group consisting of muscles attached to a proximal end of a humerus.

13. The method of claim 10 wherein the meat attached to the scapula bone is trimmed to leave a less substantial portion of the muscles adhering to the scapula bone.

14. The method of claim 10 wherein the meat attached to the scapula bone is trimmed to create a cut with a lower ratio of meat to bone.

15. The method of claim 10 wherein a cutaneous tissue covering the meat attached to the scapula bone is removed, creating a skinless cut.

16. The method of claim 10 further comprising:
    placing multiple meat cuts having the scapula bone and the meat attached to the scapula bone in a side-by-side orientation; and
    bonding the side-by-side meat cuts together using a meat bonding agent to create a linked rack of cuts having the scapula bone and the meat attached to the scapula bone.

17. A meat product formed in accordance with the method of claim 10.

18. A method for cutting and boning a carcass of a fowl which includes a scapula bone and muscles adhering to the scapula bone, the method comprising:
    removing the wings from the carcass of the fowl, thereby forming a wingless carcass;
    cutting across a back section of the carcass of the fowl between a dorsal ball end of the scapula bone and a pair of thighs;
    cutting longitudinally between a left scapula bone and a right scapula bone, substantially perpendicular to the previous incision;
    cutting on a left side of the carcass of the fowl between a breast section and a section including muscles adhering to the scapula bone;
    forming an incision on the left side of the carcass of the fowl, the incision starting between the dorsal ball end of the scapula bone and a gluteus medius muscle sheath, and extending along a backbone toward where a head was formerly connected to the carcass of the fowl until reaching a joint connecting the left scapula bone to a coracoid bone; and dislodging the left scapula bone from the joint connecting the left scapula bone to the coracoid bone, thereby separating the scapula bone and the muscles adhering to the scapula bone from the carcass of the fowl.

19. The method of claim 18 wherein the same scapula bone removal method is repeated on the right side of the carcass of the fowl, resulting in the carcass yielding two meat cuts having the scapula bone and the muscles adhering to the scapula bone separated from the carcass of the fowl.

20. The method of claim 18 wherein the muscles adhering to the scapula bone include muscles from the groups consisting of a spinatus, a trapezius, a rhomboideus, a teres major, a serratus ventralis, a serratus dorsalis, a subscapularis, and a teres minor.

21. The method of claim 18 wherein the muscles adhering to the scapula bone are trimmed to leave a less substantial portion of the muscles adhering to the scapula bone.

22. The method of claim 18 wherein the muscles adhering to the scapula bone are trimmed to create a meat cut with a lower ratio of meat to bone.

23. The method of claim 18 wherein grabbing onto a muscle flap between the backbone and the scapula bone while cutting along the backbone causes the muscles to tighten in tension, allowing smoother cutting.

24. The method of claim 18 further comprising:
placing multiple meat cuts having the scapula bone and the muscles adhering to the scapula bone in a side-by-side orientation; and
bonding the side-by-side meat cuts together using a meat bonding agent to create a linked rack of meat cuts having the scapula bone and the muscles adhering to the scapula bone.

25. The method of claim 24 wherein the linked rack of meat cuts having the scapula bone and the muscles adhering to the scapula bone is cold-bonded together to create an uncooked, linked rack.

26. The method of claim 24 wherein the meat cuts having the scapula bone and the muscles adhering to the scapula bone are pre-cooked prior to being bonded together to create a pre-cooked rack of meat cuts having the scapula bone and the muscles adhering to the scapula bone.

27. The method of claim 18 wherein a cutaneous tissue covering the muscles adhering to the scapula bone is removed, creating a skinless meat cut.

28. A meat product formed in accordance with the method of claim 18.

* * * * *

UNITED STATES PATENT AND TRADEMARK OFFICE
CERTIFICATE OF CORRECTION

PATENT NO. : 6,769,977 B2
DATED : August 3, 2004
INVENTOR(S) : Ted V. Kuck

It is certified that error appears in the above-identified patent and that said Letters Patent is hereby corrected as shown below:

Column 7,
Lines 27, 30 and 35, after "wherein", insert -- after removing the scapula bone and muscles adhering to the scapula bone from the carcass of the fowl, --

Column 8,
Lines 19 and 24, after "wherein" insert -- after separating the scapula bone from either the left side or the right side of the whole carcass of the fowl, --

Column 9,
Line 10, after "wherein", insert -- after separating the scapula bone and the muscles adhering to the scapula bone from the carcass of the fowl, --

Signed and Sealed this

Fifth Day of July, 2005

JON W. DUDAS
*Director of the United States Patent and Trademark Office*